United States Patent [19]

Ballard et al.

[11] Patent Number: 5,533,114
[45] Date of Patent: Jul. 2, 1996

[54] TELECOMMUNICATION SYSTEM COMPRISING SUBSCRIBER CONNECTION UNITS HAVING INDEPENDENT ROUTING ABILITY

[75] Inventors: Michel Ballard, Clamart; Edouard Issenmann, Le Chesnay, both of France

[73] Assignee: Alcatel Cit, Paris, France

[21] Appl. No.: 201,094

[22] Filed: Feb. 24, 1994

Related U.S. Application Data

[63] Continuation of Ser. No. 727,722, Jul. 10, 1991, abandoned.

[30] Foreign Application Priority Data

Jul. 11, 1990 [FR] France .................................. 90 08838
Sep. 28, 1990 [FR] France .................................. 90 12005

[51] Int. Cl.⁶ .......................... H04M 7/06; H04M 7/14; H04M 11/00
[52] U.S. Cl. .......................... 379/220; 379/60; 379/230; 379/333
[58] Field of Search ............................ 379/58, 59, 63, 379/335, 333, 230, 221, 207, 220, 219, 60; 370/56, 58.3

[56] References Cited

U.S. PATENT DOCUMENTS

| | | | |
|---|---|---|---|
| 4,566,094 | 1/1986 | Ardon et al. | 370/58.3 |
| 4,583,218 | 4/1986 | Ardon et al. | 370/58.3 |
| 4,621,358 | 11/1986 | Jotwani | 370/56 |
| 4,972,465 | 11/1990 | Cline et al. | 379/279 |

FOREIGN PATENT DOCUMENTS 0125605  11/1984  European Pat. Off. ....... H04Q 11/04

OTHER PUBLICATIONS

"System 900: The ISDN Approach to Cellular Mobile Radio", W. Weiss et al, *Electrical Communication*, vol. 63, No. 4—1989, pp. 400–408.

Proceedings of the National Communications Forum, vol. 42, No. 2, Sep. 20, 1988, pp. 1272–1279, Chicago, US; J. P. Lodwig: "Stand Alone vs. remote".

Conference Record, IEEE International Conference on Communications '86, Toronto, Jun. 22–25, 1986, vol. 2, pp. 1094–1099; M. M. Wienshienk: "GTD-5-eax remote switching unit—extension of a distributed system".

Conference Record, IEEE Global Telecommunications Conference, Hollywood, Nov. 28–Dec. 1, 1988, vol. 3, pp. 1211–1220; N. Skaperda: "The EWSD today, plans for tomorrow".

Conference Record, IEEE Global Telecommunications Conference, Hollywood, Nov. 28–Dec. 1, 1988, pp. 1200–1204; R. F. Kurtz et al.: "DCO networking solutions to the provision of advanced features in rural and suburban telephone networks".

*Primary Examiner*—Thomas W. Brown
*Attorney, Agent, or Firm*—Sughrue, Mion, Zinn, Macpeak & Seas

[57] ABSTRACT

A cellular radiotelephone network including a connection unit having a conventional first No. 7 signalling point for providing conventional control of access to a parent exchange for subscribers connected to connection units by means of signalling messages in compliance with interface A as defined by a the Special Mobile Group (GSM) and a second No. 7 signalling point and No. 7 links to a signalling point of a service control point, where the links convey an "intelligent network interface" for enabling the control point to control connections established by one of the connection units between subscribers connected to that unit, or connections established directly to other connection units, or connections established to the public network without said connections requiring a link via the parent exchange of the units.

11 Claims, 5 Drawing Sheets

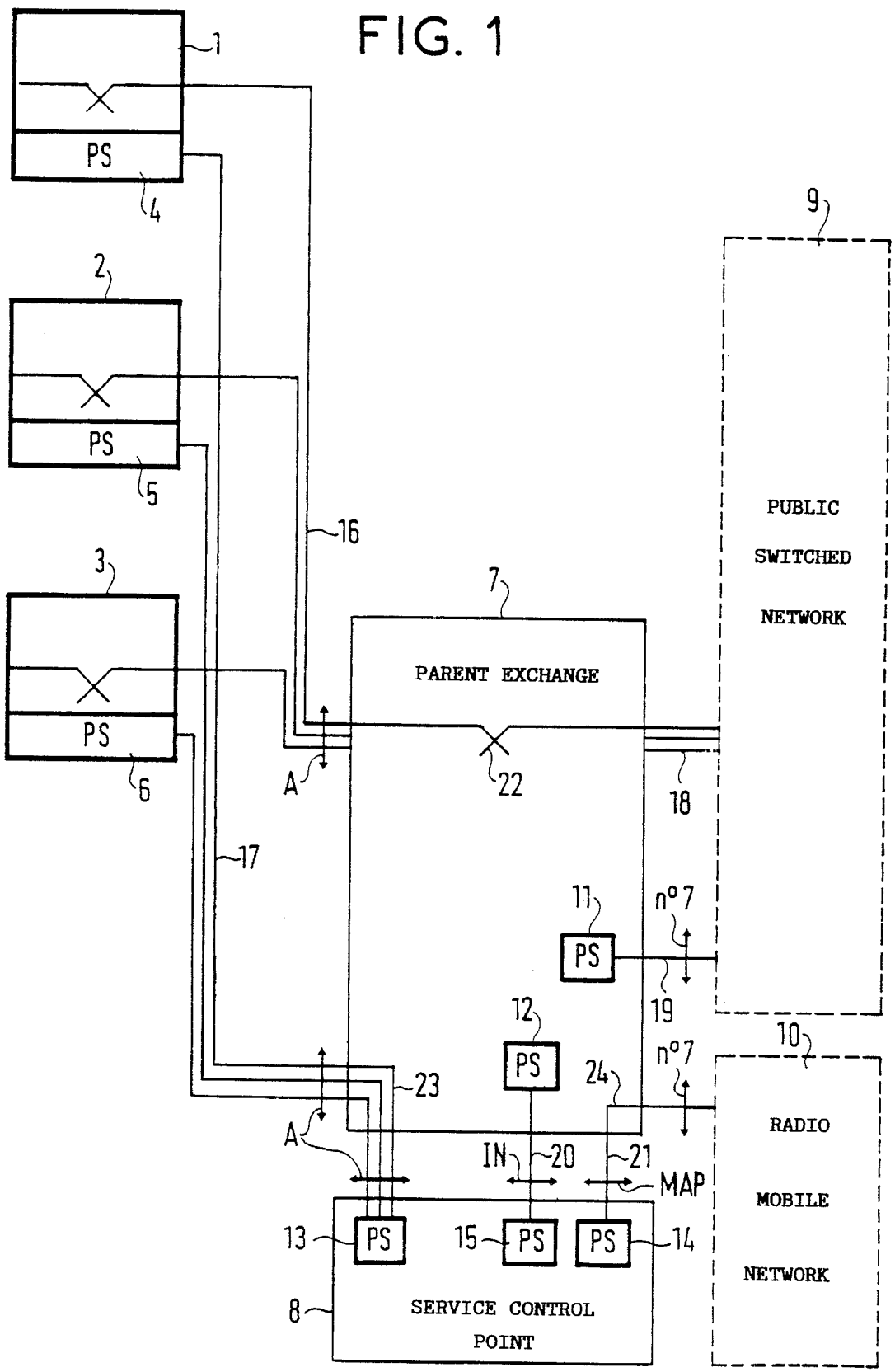

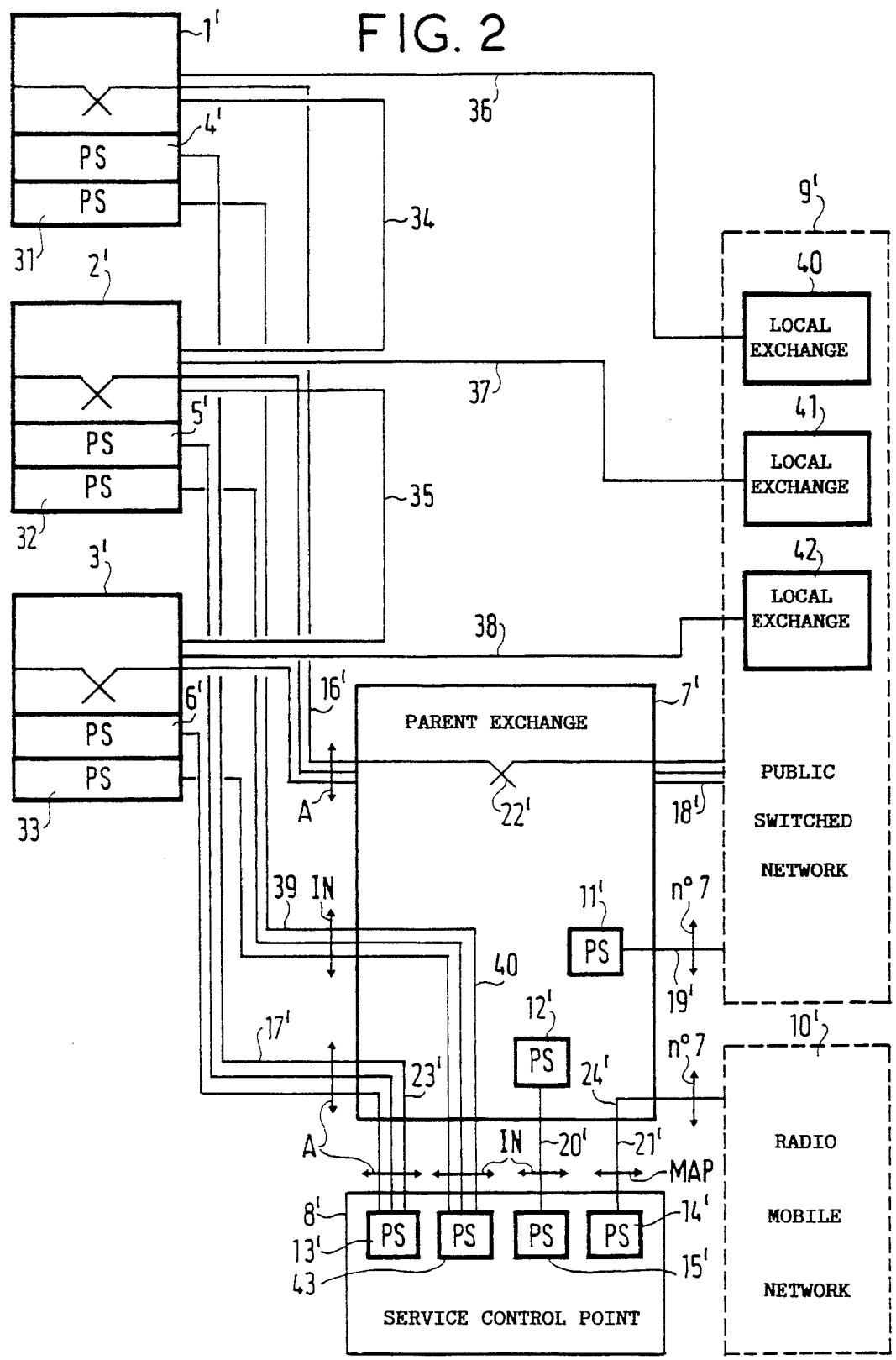

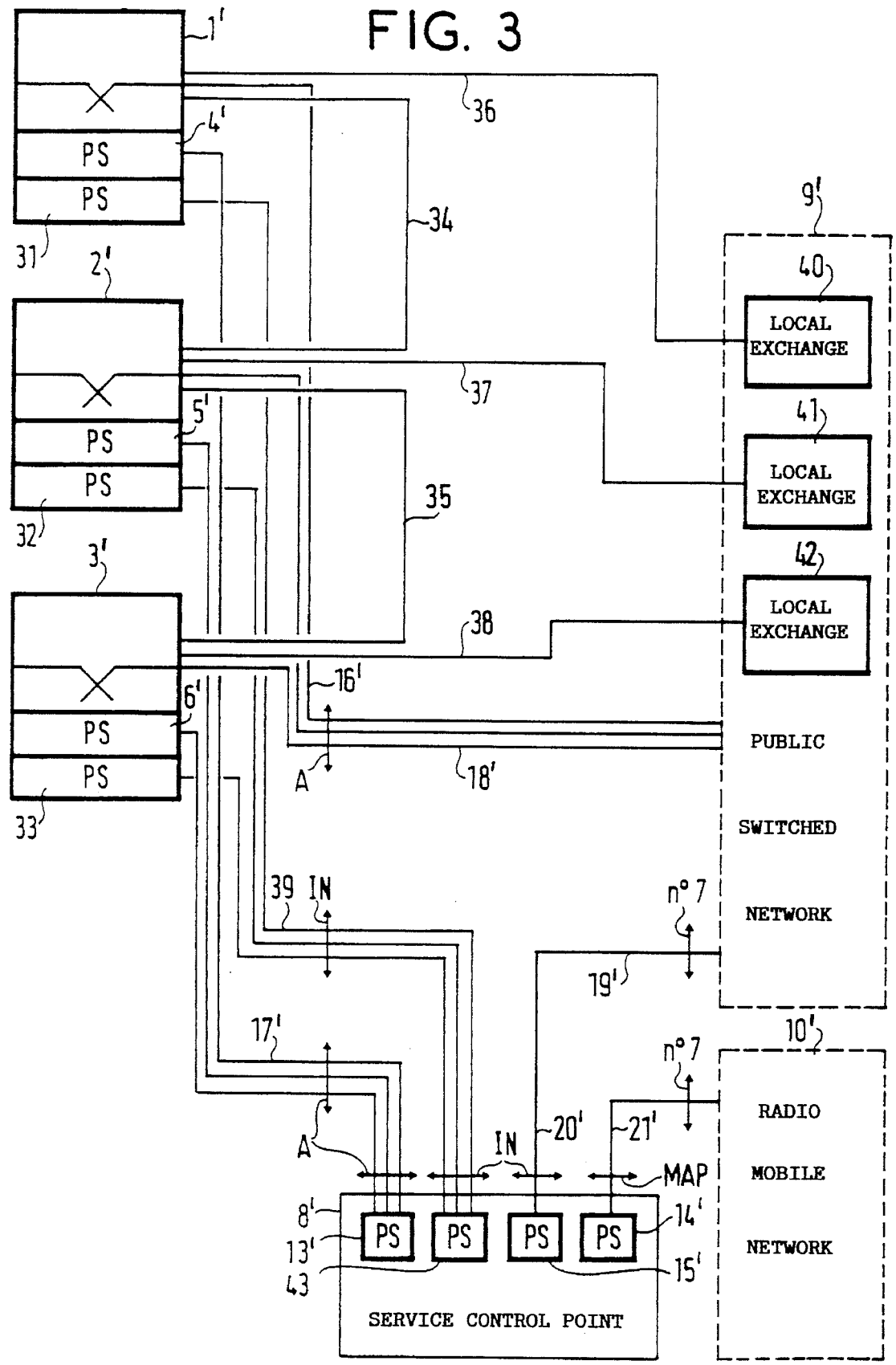

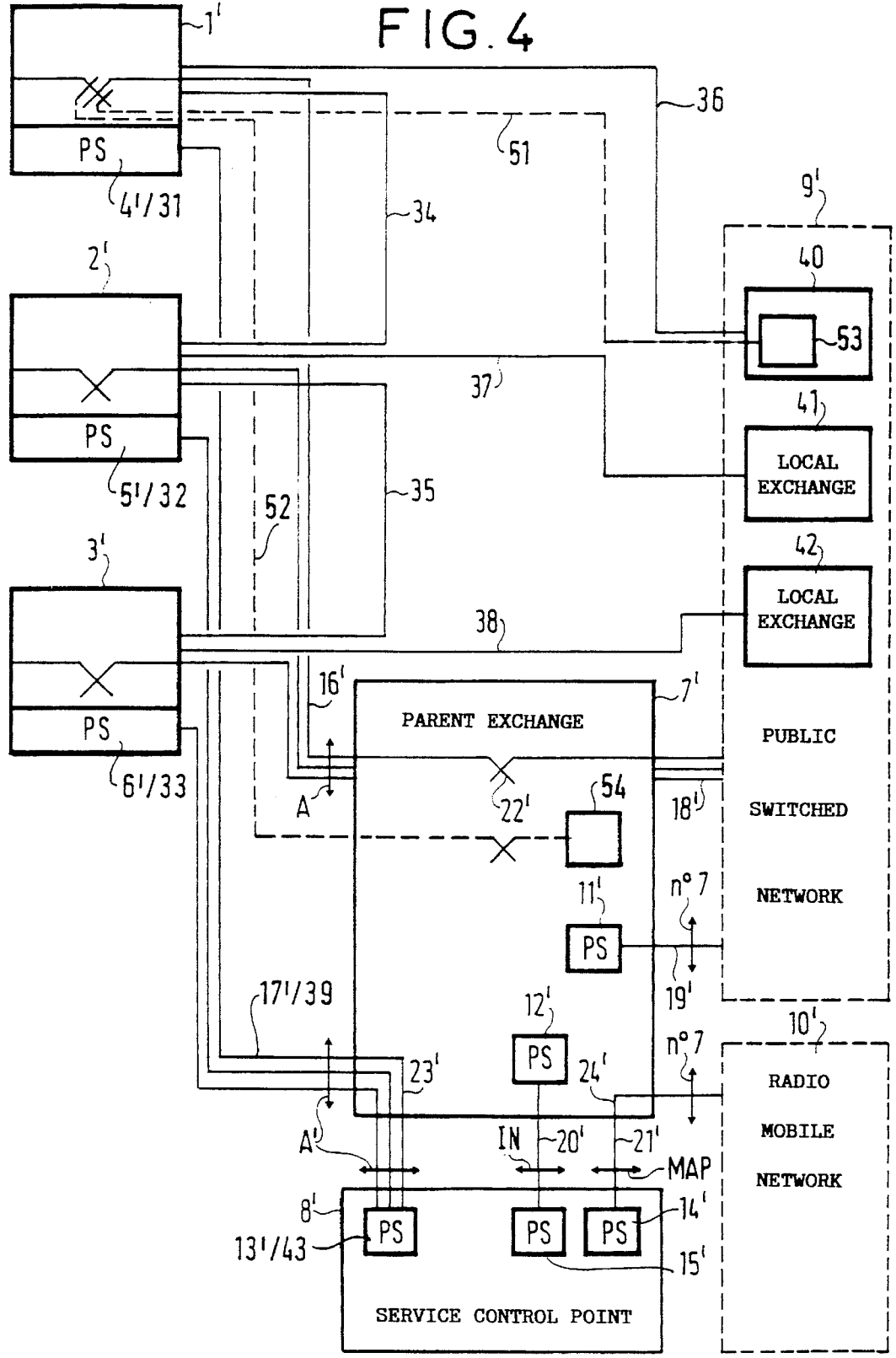

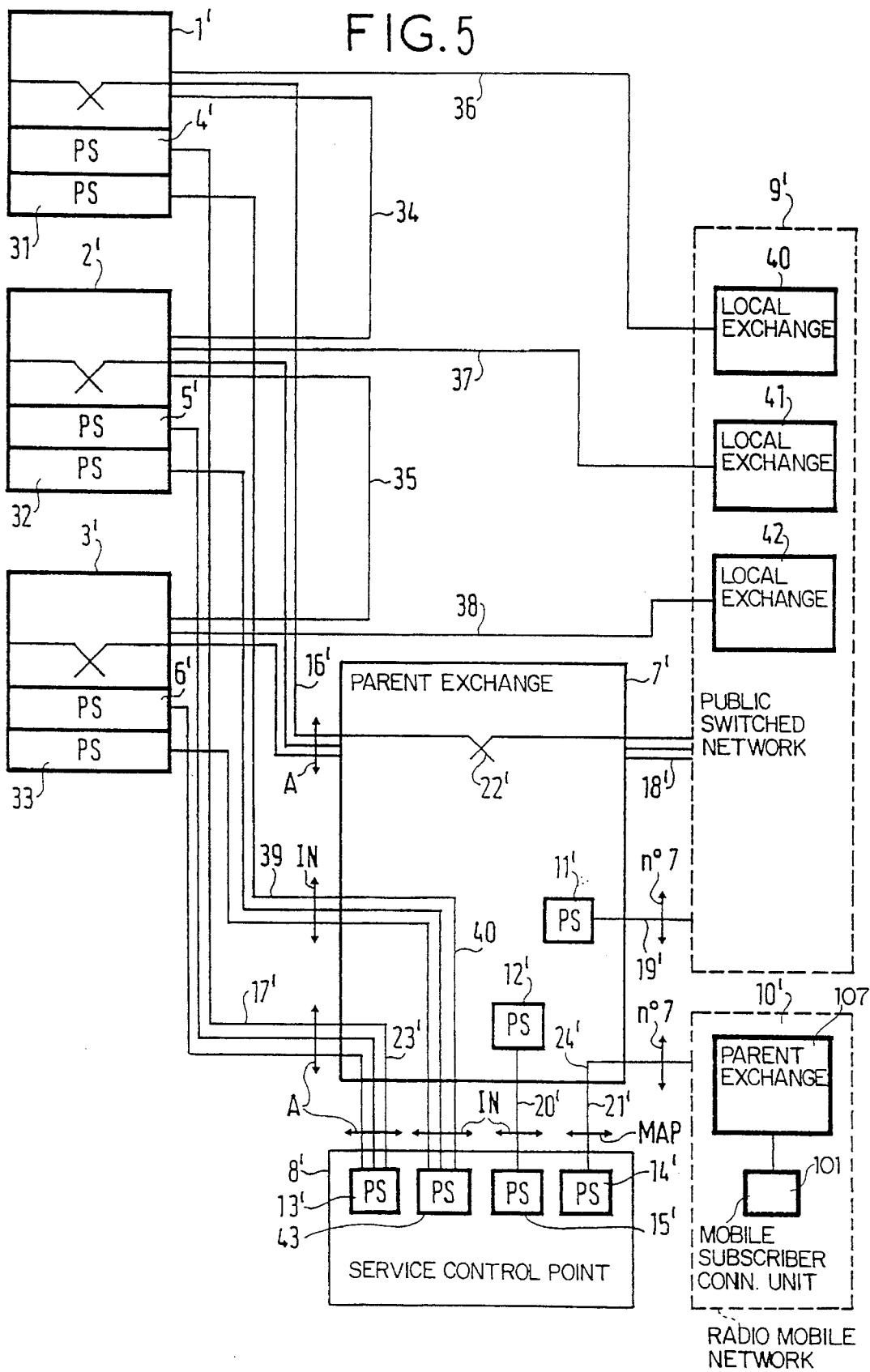

TELECOMMUNICATION SYSTEM COMPRISING SUBSCRIBER CONNECTION UNITS HAVING INDEPENDENT ROUTING ABILITY

This is a Continuation of application Ser. No. 07/727,722 filed Jul. 10, 1991, now abandoned.

The invention relates to a subscriber connection unit with independent routing ability, for use in a telecommunications network having an intelligent network structure, the network including exchanges and service control points controlling the exchanges.

BACKGROUND OF THE INVENTION

Conventionally, subscribers are connected to exchanges via subscriber connection units. Each connection unit is connected to an exchange via telephone channels and a No. 7 channel for conveying signalling in compliance with CCITT protocol No. 7. Connection units may be situated close to their parent exchange or at a certain distance therefrom.

Calls between two subscribers necessarily pass via the exchange even though that constitutes an elongation of the path followed by such calls whenever a call is to be established between two subscribers connected to the same unit, or between two units that are very close together. An article entitled (in translation) "The exchange, master ISDN component" published in "Communication et Transmission", No. 3, 1987, page 73 et seq., describes a connection unit (a digital satellite exchange) of the Alcatel E10 system. An article entitled (in translation) "AXE 10 in France" published in "Commutation et Transmission", No. 4, 1988, page 54, describes another subscriber connection unit. Both of those connection units include emergency functions providing independent routing ability for local calls and for use in the event of the semaphore channel to the parent exchange being interrupted. However these functions are very limited. The connection units are not capable of communicating with other nearby connection units, nor are they capable of communicating with local exchanges that are closer than the parent exchange. Local calls are thus always routed in a way that makes use of transmission resources between each connection unit and its parent exchange, even though the shortest possible path would not necessarily go via the parent exchange.

The architecture of present networks is thus the result of a compromise between an architecture comprising few exchanges with connection units that are remote from the exchanges, thereby minimizing switching costs while maximizing transmission costs, and an architecture comprising many exchanges with connection units close to the exchanges, thereby minimizing transmission costs while maximizing switching costs.

An object of the invention is to provide a switching unit that overcomes this dilemma, i.e. which enables transmission costs to be reduced without increasing the number of exchanges.

SUMMARY OF THE INVENTION

The present invention provides a subscriber connection unit having independent routing ability for a telecommunications network having an intelligent network structure, said network including exchanges controlled by service control points by means of predetermined operations called "intelligent network interface", and conveyed by protocols that are compatible with CCITT protocol No. 7; the subscriber connection unit being connected to a "parent" exchange via telephone links and to a service control point via a first conventional No. 7 signalling link for controlling subscriber access to the parent exchange;

wherein the subscriber connection unit is also connected to a service control point via a No. 7 signalling link conveying the intelligent network interface for the purpose of enabling said service control point to control connections established by said unit between subscribers connected to the same unit or connections established to another unit, or connections established to the network without these connections requiring a link via the parent exchange.

Given that telephone operation provides for various tones and voice messages to be provided to subscribers, be they local or remote, it follows that the connection unit must include expensive means for generating such tones and messages.

According to another feature, the subscriber connection unit is further connected via semi-permanent links to the parent exchange and/or to one or more local exchanges of the switched public network, with channels of said connection(s) serving to convey tones and messages for transmission to subscribers from generators provided in said exchanges, whenever operating conditions so require.

In addition, provision is also made not only for said first and second signalling links to be physically conveyed by the same No. 7 signalling channel, but also to use the same protocol between a single signalling point in the connection unit and a single signalling point in the service control point, which protocol, for the purposes of enabling the connection to be remotely controlled, includes interface functions for giving access to the subscribers of the connection unit, e.g. the Special Mobile Group (GSM) interface A, and at least a subset of the functions of the intelligent network interface or of a functional equivalent thereof.

Further, according to another feature, the above-defined means are adapted to enable a transfer connection to be established under remote control of first and second connection units via the signalling links connecting them to their parent exchange, to extend a call coming from a local exchange and conveyed by a direct communication link between said local exchange and said first connection unit to the second connection unit which may or may not depend from the same parent exchange, via a direct link between the two connection units under consideration, and then subsequently and in the same way, where applicable, to extend the calls to a third connection unit.

When said first and second connection units depend from different parent exchanges, then the parent exchanges are adapted to interchange the information required for remotely controlling the two connection units concerned by extending the signalling protocol conveyed over a signalling link interconnecting them.

Advantageously, provision is similarly made for transferring a call to the parent exchange via communication links existing between any one of the connection units and the parent exchange.

BRIEF DESCRIPTION OF THE DRAWINGS

Embodiments of the invention are described by way of example with reference to the accompanying drawings, in which:

FIG. 1 is a block diagram of a first example of a prior art intelligent network including connection units and for use with subscribers to a cellular radiotelephone service;

FIG. 2 is a block diagram of a second example of an intelligent network including connection units, and in accordance with the invention, for subscribers to a cellular radiotelephone service;

FIG. 3 is a block diagram of a variant of the second example network; and

FIG. 4 is a block diagram of a different variant of the second example network.

FIG. 5 illustrates one of the other exchanges 107 and subscriber connection unit 101 which are arranged in the radio mobile network 10'.

DETAILED DESCRIPTION

The example intelligent networks described below are for use in a cellular radiotelephone service, however the invention is also applicable to units for connecting subscribers to networks that provide other services providing the network includes service control points which impart an intelligent network structure thereto by centralizing data relating to a service and also centralizing the logic for processing the service. Examples include wireless telephone services or "phone points"; personal communications networks; private automatic branch exchanges (PABX); and the public telephone or data transmission network.

The example network shown in FIG. 1 comprises:

three subscriber connection units 1 to 3 implemented in accordance with the prior art and each connected to subscribers via radio transmit/receive stations (not shown);

a parent exchange 7 which is connected to a public switched network 9 to provide access for the subscribers connected to the units 1 to 3 to the public network 9; and a radio service control point 8 which is connected to a mobile radio network 10 including other exchanges and other service control points (not shown).

FIG. 5 illustrates one of the other exchanges 107 and subscriber connection unit 101 which are arranged in the radio mobile network 10'.

The connection units 1, 2, and 3 are connected to inputs/outputs of a switching matrix 22 in the parent exchange 7 via speech links 16 that comply with interface A as defined by the Special Mobile Group (GSM). The inputs/outputs of the switching matrix 22 are connected to the public switched network 9 via speech links 18. The switching matrix 22 provides the mobile subscribers connected to the units 1, 2, and 3 with access to the cellular radiotelephone service, and possibly also with access to other services.

The connection units 1, 2, and 3 include respective signalling points (PS) 4, 5, and 6 which are connected to inlets/outlets of the parent exchange 7 via signalling links 17 in compliance with GSM interface A and serving to control access of the subscribers connected to the units 1, 2, and 3 to the parent exchange 7. The parent exchange 7 connects the links 17 to a signalling point 13 in the radio service control point 8 via semi-permanent connections 23.

The parent exchange 7 possesses a signalling point 11 which is connected to the public switched network 9 via a link 19 for interchanging conventional signalling messages associated with the speech links 18. These messages comply with CCITT protocol No. 7.

A signalling point 12 of the parent exchange 7 is permanently connected to a signalling point 15 of the radio service control point 8 via a link 20. The function of the radio service control point 8 is to remotely control the exchange 7 so as to provide the service. It dialogs with the parent exchange 7 via the link 20 and by means of a set of predetermined operations which constitute an "intelligent network" interface referenced IN in the figures. For example, this set of operations may be the set described in the article "Digital cellular mobile-radio system ECR 900" published by ARTI GRAFICHE STEFANO PINELLI 20129 MILANO, via Farneti 8, Italy, in "European Transactions on Telecommunications and Related Technologies", No. 1, Vol. 1, 1990, page 17, FIG. 5. This known set of operations is supported by protocols that are compatible with CCITT protocol No. 7.

A signalling point 14 of the control point 8 is connected to an inlet/outlet of the parent exchange 7 via a signalling link 21. A semi-permanent link 24 established via the parent exchange 7 connects the link 21 to the radio-mobile network 10. The link 21-24 complies with CCITT protocol No. 7. It conveys signalling messages specific to the radio-mobile network 10 using a so-called "mobile application part protocol" referenced MAP, which is compatible with protocol No. 7. The radio-mobile network 10 includes, in particular, a home location register and an authentication center. A visitor location register is situated either in the network 10 or else in the control point 8.

FIG. 2 is a block diagram of a cellular radiotelephone network comprising: subscriber connection units 1', 2', and 3' of the invention; a parent exchange 7'; a radio service control point 8'; a public switched network 9'; and a radio-mobile network 10'.

The connection units 1', 2', and 3' include signalling points 4', 5', and 6' analogous to the signalling points 4, 5, and 6 of connection units 1, 2, and 3 as described above. The components of this network that are analogous to those of the network described above and shown in FIG. 1 are given the same numerical references plus a prime symbol, and they perform similar functions. This applies in particular to signalling points 4', 5', and 6' which are used for first No. 7 signalling links 17' to control the access of the subscribers connected to the units 1', 2', and 3' to the parent exchange 7'.

The units 1', 2', and 3' further include respective additional signalling points 31, 32, and 33 connected to inlets/outlets of the parent exchange 7' via second No. 7 signalling links 39 in compliance with the "intelligent network" interface. The parent exchange 7' connects the links 39 to an additional signalling point 43 in the control point 8' via semi-permanent links 40. The signalling points 31, 32, and 33 and the links 39-40 give the units 1', 2', and 3' the "intelligence" required for performing independent routing of subscriber calls, i.e. they give the service control point 8' remote control in said units over the following functions: translation, charging, signalling, etc. to control the setting up of connections within one of said units between subscribers connected to the same unit, or connections to a different connection unit, or connections to the public network 9', without it being necessary for these connections to use a link via the parent exchange 7'.

In addition, the network is analogous to that described above and shown in FIG. 1 except in that it includes additional telephone links 34 and 35 directly interconnecting the connection units, and links 36, 37, and 38 directly connecting said units 1', 2', and 3' to local exchanges 40, 41, and 42 of the public network 9'. The links 34 and 35 enable the connection units to intercommunicate without going via the parent exchange 7'. The links 36, 37, and 38 enable the connection units to communicate with respective local exchanges 40, 41, and 42 without going via the exchange 7' which is generally further away from the connection units than are the local exchanges 40 to 42.

The connection units of the invention thus provide: reduced transmission costs; greater flexibility in network organization; and better security enabling local calls to be performed even in the event of the speech links 16' to the parent exchange 7' being interrupted. It should be observed that in this network example, the control point for the connection units is the control point 8' that controls the parent exchange 7' for said connection units. There is no need to add an additional control point for the connection units. Network developments can thus be continued with practically no additional cost for controlling additional connection units.

It would be possible to provide a control center without a parent exchange, and serving solely to control the connection units by remote control over the intelligent network interface.

FIG. 3 shows an example of such a network. Items that are analogous to those of the previously described example shown in FIG. 2 are given the same numerical references. There are no additional items. However the parent exchange 7' is omitted. The connection units 1', 2', and 3' are connected directly to the public switched network 9' via telephone links 16' and 18' which are connected together on a permanent basis. The signalling links 20' and 19' are connected together on a permanent basis to connect the signalling point 15' of the service control point 8' directly to the public network 9'. The semi-permanent links 40 and 23' are replaced by permanent links connecting the signalling points 31, 32, and 33 to signalling point 43 and connecting the signalling points 4', 5', and 6' to signalling point 13'. The point giving each unit 1', 2', and 3' access to the network 9' is now one of the exchanges in the network 9' (not shown).

The direct link from signalling point 15' of control point 8' to the switched public network 9' as described above with reference to FIG. 3 may also be applied to the network example shown in FIG. 2. In such a case, signalling point 11' would be moved from the exchange 7' to the control point 8'. Signalling point 11' would then be connected to the switched public network 9' via semi-permanent links passing through the parent exchange 7'. Signalling messages for the parent exchange 7' would then pass via the signalling points 15' and then 12' before reaching the exchange 7'.

In the network examples described above with reference to FIGS. 2 and 3, additional signalling points 31, 32, 33, and 43 are added to the conventional signalling points 4', 5', 6', and 13' in order to convey second No. 7 signalling links for implementing the intelligent network interface. In a variant embodiment, signalling points 4' & 31, and other similar pairs, are constituted by the same equipment. Similarly, the No. 7 signalling points enable various types of No. 7 signalling to be transmitted using different protocols over the same No. 7 channel. The first and second No. 7 signalling links 17' and 39 may thus be physically supported by a single No. 7 signalling channel and by a common signalling point.

In general, all of the items already present in FIG. 2 reappear in FIG. 4 with the same references, apart from exceptions mentioned below. The present description is thus limited to additional items constituting the present invention.

The connection units 1', 2', and 3' differ from those of FIG. 2 in that each of them now includes a single signalling point PS 4'/31, 5'/32, or 6'/33 which combines the functions of the two preceding signalling points. These single signalling points are connected via respective No. 7 signalling links 17'/39 to the service control point 8'. These signalling links 17'/39 are connected in the parent exchange 7' via semi-permanent connections 23' to a single signalling point 13'/43 in the service control point 8'. The protocol that is applied (A') is extended to enable the connection unit to be remotely controlled and it includes functions for interfacing access of the subscribers to the parent exchange, e.g. GSM interface A, and at least a subset of the interface functions of the intelligent network or of a functional equivalent thereof.

For little extra cost, such dispositions make it possible to use one protocol fewer in communications between connection units and the service control point.

In addition, at least one connection unit 1' is connected via a service signal link 52 to the parent exchange 7' in which said service link 52 is connected on a semi-permanent basis to a tone and voice message generator 54.

As a result, the connection unit 1' receives from the parent exchange 7' those tones which it requires for responding to the service requirements to be provided to subscribers when setting up connections between subscribers on the same subscriber connection unit or on subscriber connection units that are close together and interconnected via direct call links such as 34 and 35, or on nearby local exchanges of the switched public network reached via direct links such as 36, 37, and 38.

The service signal link in question comprises one speech path per tone or voice message and constitutes a portion of the communication links 16' connecting the subscriber connection unit 1' to the parent exchange 7'. For reasons of security, it is preferably duplicated.

FIG. 4 also shows another solution to the same problem which can be used instead of or besides the preceding solution, whereby a service signal link 51 leads to a tone and voice message generator 53 in a local exchange 40 of the switched public network 9'. In this case there is no need to duplicate the link, particularly if it is conveyed by the same means as the signalling path between the connection unit and the local exchange.

The generators 53 and 54 may be those that are normally provided in local exchanges and in the parent exchange, thereby making the solution suggested particularly cheap.

Similar dispositions may be provided between the connection unit 11 under consideration and each of the local exchanges to which it is connected, e.g. 41 and 42.

All of the subscriber connection units may be processed in the manner described above.

The means as described in this way may easily be adapted to respond to remote control from the connection unit 1', for example, via signalling links 17'/39, to enable a transfer connection to be established extending a call from local exchange 40 and using communication link 36 to connection unit 2', for example, via direct link 34 and then subsequently, in the same manner, and where applicable, to another connection unit such as 3', e.g. for the purpose of following the displacement of a mobile subscriber.

The first connection unit under consideration 1' may also be transferred to a different connection unit 101 depending from a parent exchange 107 other than the parent exchange 7', as illustrated in FIG. 5 in the FIGS. 2–4, as illustrated in FIG. 5. To cope with the requirements of such a situation, the parent exchanges should be adapted to interchange the information required for remotely controlling the two connection units concerned (e.g. 1') by extending the signalling protocol that is conveyed over a signalling link (e.g. 21') interconnecting them.

Provision may also be made to transfer a call to the parent exchange 7' from any one of the connection units and via the communication links 16'.

The scope of the invention is not limited to the network examples described above. It is applicable to the connection units of other telecommunications networks having an intelligent network structure.

We claim:

1. A telecommunication system comprising:

subscriber connection units having independent routing ability for a telecommunications network having an intelligent network structure, said telecommunications network including exchanges controlled by service control point means by means of predetermined operations constituting an intelligent network interface, and conveyed by protocols that are compatible with CCITT protocol No. 7;

each of the subscriber connection units being connected to an associated parent exchange via speech links and to said service control point means via a first No. 7 signalling link for controlling subscriber access to the associated parent exchange;

wherein the subscriber connection units are also connected to said service control point means via a second No. 7 signalling link conveying the intelligent network interface for the purpose of enabling said service control point means to control connections between subscribers connected to the same subscriber connection unit, connections between subscribers connected to different ones of said subscriber connection units, and connections from said subscriber connection units to a public switched network without requiring a speech link via the associated parent exchange.

2. The telecommunication system according to claim 1, wherein the service control point means to which a particular subscriber connection unit is connected via said second No. 7 signalling link conveying the intelligent network interface is a common service control point controlling the parent exchange of said particular subscriber connection unit.

3. A telecommunication system comprising:

subscriber connection units having independent routing ability for a telecommunications network having an intelligent network structure and comprising a public switched network, said telecommunications network being controlled by service control point means by means of predetermined operations constituting an intelligent network interface, and conveyed by protocols that are compatible with CCITT protocol No. 7;

each of the subscriber connection units being connected to said service control point means via a first No. 7 signalling link, and via a second No. 7 signalling link conveying the intelligent network interface;

wherein the service control point means is directly connected to said public switched network via another No. 7 signalling link in compliance with said intelligent network interface.

4. The telecommunication system according to claim 1, wherein said first and second No. 7 signalling links are physically conveyed by a single No. 7 signalling channel and by a single signalling point in each of said subscriber connection units.

5. The telecommunication system according to claim 1, wherein each of said subscriber connection units is further connected via semi-permanent links to said associated parent exchange and to at least one local exchange of the switched public network, with channels of said semi-permanent links serving to convey tones and messages for transmission to said subscribers of each of said subscriber connection units from generators provided in said at least one local exchange, whenever operating conditions so require.

6. The telecommunication system according to claim 4, wherein said first and second No. 7 signalling links are not only physically conveyed by the same No. 7 signalling channel, but also use the same protocol between a single signalling point in each of said subscriber connection units and a single signalling point in the service control point means, which protocol, for the purposes of enabling each of said subscriber connection units to be remotely controlled, includes interface functions for giving, to said subscribers connected to each of said subscriber connection units, access to the telecommunication system, and at least a subset of the functions of the intelligent network or a functional equivalent thereof.

7. The telecommunication system according to claim 1, wherein at least two of said subscriber connection units are linked by a direct link.

8. The telecommunication system according to claim 1, wherein at least one of said subscriber connection units is linked to a local exchange, which is not a parent exchange corresponding to said at least one of said subscriber connection units, by a direct link.

9. A telecommunication system comprising:

subscriber connection units having independent routing ability for a telecommunications network having an intelligent network structure, said telecommunications network including exchanges controlled by service control point means by means of predetermined operations constituting an intelligent network interface, and conveyed by protocols that are compatible with CCITT protocol No. 7;

each of the subscriber connection units being connected to an associated parent exchange via speech links and to said service control point means via a No. 7 signalling link for controlling subscriber access to the associated parent exchange and for conveying the intelligent network interface;

wherein at least two parent exchanges are interconnected by a signalling link conveying an extended No. 7 signalling protocol for interchanging information required for remotely controlling two of said subscriber connection units respectively connected to said two parent exchanges.

10. The telecommunication system according to claim 1, wherein each of said subscriber connection units is further connected via semi-permanent links to at least one local exchange of the switched public network, with channels of said semi-permanent links serving to convey tones and messages for transmission to said subscribers of each of said subscriber connection units from generators provided in said at least one local exchange, whenever operating conditions so require.

11. The telecommunication system according to claim 1, wherein the service control point means comprises a first service control point for controlling access to a parent exchange corresponding to at least one of said subscriber connection units and a second service control point for controlling connections between subscribers connected to the same subscriber connection unit, connections between subscribers connected to different subscriber connection units, and connections from said subscriber connection units to the public switched network without requiring a speech link via the parent exchange.

* * * * *